US011017408B2

(12) United States Patent
Duca et al.

(10) Patent No.: US 11,017,408 B2
(45) Date of Patent: May 25, 2021

(54) SECURE DELIVERY SYSTEM, LOGGING MODULE AND ACCESS CONTROLLED CONTAINER (71) Applicant: SICPA HOLDING SA, Prilly (CH)

(72) Inventors: Nicola Duca, Monthey (CH); Alexandre Boulle, Divonne-les-Bains (FR)

(73) Assignee: SICPA HOLDING SA, Prilly (CH)

( * ) Notice: Subject to any disclaimer, the term of this patent is extended or adjusted under 35 U.S.C. 154(b) by 235 days.

(21) Appl. No.: 15/766,968

(22) PCT Filed: Oct. 10, 2016

(86) PCT No.: PCT/EP2016/074151
§ 371 (c)(1),
(2) Date: Apr. 9, 2018

(87) PCT Pub. No.: WO2017/060511
PCT Pub. Date: Apr. 13, 2017

(65) Prior Publication Data
US 2018/0300733 A1 Oct. 18, 2018

(30) Foreign Application Priority Data

Oct. 8, 2015 (EP) .................................... 15189033

(51) Int. Cl.
*G06Q 30/00* (2012.01)
*G06Q 10/08* (2012.01)
(Continued)

(52) U.S. Cl.
CPC ...... *G06Q 30/0185* (2013.01); *B41J 2/17509* (2013.01); *B41J 2/17533* (2013.01);
(Continued)

(58) Field of Classification Search
CPC .................................................. G06K 7/10366
See application file for complete search history.

(56) References Cited

U.S. PATENT DOCUMENTS 5,995,774 A * 11/1999 Applegate .......... G03G 21/1889
399/27
7,455,225 B1 * 11/2008 Hadfield ................ G07C 5/085
235/384
(Continued)

FOREIGN PATENT DOCUMENTS

CN 101167295 4/2008
CN 102700251 10/2012
(Continued)

OTHER PUBLICATIONS

International Search Report and Written Opinion issued with respect to application No. PCT/EP2016/074151.
(Continued)

*Primary Examiner* — Madhuri R Herzog
(74) *Attorney, Agent, or Firm* — Muncy, Geissler, Olds & Lowe, P.C.

(57) ABSTRACT

A logging module for identifying a suspected tampering condition of an access-controlled container, the logging module comprising: data collection means configured to collect data from said access-controlled container; and communication means for communicatively connecting the logging module across a network to a database storing a use history associated with said access-controlled container; wherein the logging module is configured to compare the collected data to the corresponding use history associated with said access-controlled container stored in the database to identify a suspected tampering condition of said access-controlled container, wherein the use history comprises data associated with the weight and/or volume of content of the access-controlled container.

12 Claims, 6 Drawing Sheets (51) Int. Cl.
   *B41J 2/175*   (2006.01)
   *G06F 21/86*   (2013.01)
   *G06F 21/82*   (2013.01)
   *G06K 7/10*    (2006.01)
   *G06F 21/70*   (2013.01)

(52) U.S. Cl.
   CPC ....... *B41J 2/17543* (2013.01); *B41J 2/17546* (2013.01); *B41J 2/17553* (2013.01); *B41J 2/17566* (2013.01); *G06F 21/82* (2013.01); *G06F 21/86* (2013.01); *G06K 7/10366* (2013.01); *G06Q 10/08* (2013.01); *G06F 21/70* (2013.01)

(56) References Cited

U.S. PATENT DOCUMENTS

| | | | |
|---|---|---|---|
| 7,580,144 | B2 * | 8/2009 | Wadley ................ B41J 2/17543 358/1.15 |
| 2004/0113783 | A1 * | 6/2004 | Yagesh ................ G06Q 10/08 340/568.1 |
| 2004/0223011 | A1 | 11/2004 | Adkins et al. |
| 2006/0087537 | A1 * | 4/2006 | Auslander ............ B41J 2/17513 347/85 |
| 2006/0164239 | A1 * | 7/2006 | Loda ................ G06K 19/07327 340/539.22 |
| 2007/0007774 | A1 | 1/2007 | Stefanic |
| 2007/0276619 | A1 * | 11/2007 | Sugahara .................. G01T 7/00 702/82 |
| 2011/0154043 | A1 | 6/2011 | Lim et al. |
| 2011/0253715 | A1 * | 10/2011 | Phaneuf ................ B65D 53/04 220/212 |
| 2012/0327471 | A1 | 12/2012 | Lapstun et al. |
| 2014/0036008 | A1 | 2/2014 | Maeshima |
| 2015/0086014 | A1 | 3/2015 | Adkins et al. |
| 2015/0370518 | A1 | 12/2015 | Ramchandran |
| 2016/0053915 | A1 * | 2/2016 | Duca ....................... F16K 1/307 141/2 |

FOREIGN PATENT DOCUMENTS

| | | |
|---|---|---|
| CN | 103568578 | 2/2014 |
| CN | 104969194 | 10/2015 |
| WO | 2004009473 | 1/2004 |
| WO | 2014161608 | 10/2014 |

OTHER PUBLICATIONS

Chinese Office Action in counterpart Chinese Application No. 201680058748.4 dated May 5, 2019 (and English language translation of the Office Action).

* cited by examiner

SECURE DELIVERY SYSTEM, LOGGING MODULE AND ACCESS CONTROLLED CONTAINER

FIELD OF INVENTION

The present invention relates generally to a secure delivery system, and more particularly to a secure ink delivery system.

BACKGROUND OF THE INVENTION

When printing, it is necessary to fill or re-fill a printer ink reservoir with ink. In order to obtain this ink, it is necessary to transport ink from an ink manufacturing site or an ink storage depot to a production printing facility, which transportation is usually effected by transporting ink cartridges storing the ink by a suitable method of transportation. The ink in the ink cartridge is then deposited into an internal printer reservoir of a printer at the production printing facility to allow the printer to print using the ink.

In some instances, the production printing facility may require the use of a security ink, which security ink may be used to signify the authenticity of high-value items. Ink cartridges containing security ink are therefore a target for counterfeiters of these high-value items. Specifically, counterfeiters may tamper with the ink cartridges storing this security ink in order to extract the security ink. Similar problems may also arise during the transfer of valuable substances other than ink from one location to another, for example during the transport of expensive or hazardous fluid.

Furthermore, the ink cartridges may be transported to several different locations before a refill operation occurs. There may therefore be several different locations or times during transport where an ink cartridge could have been tampered with. As such, determining when and where unauthorised tampering of a given ink cartridge has occurred is very difficult, and, as such, it may not be possible to identify a specific location or step in the ink cartridge supply chain at which tampering is more likely to occur.

SUMMARY OF THE INVENTION

There is therefore a need for a new and improved secure delivery system which would effectively overcome the disadvantages as outlined above. Specifically, a particular need exists for a secure delivery system that would effectively reduce the likelihood of tampering with the ink cartridges or containers containing other valuable substances. This may be achieved by accurately identifying a location or step in the supply chain at which the ink cartridges or containers have been tampered with, so that further precautions against tampering can be taken at that location or step.

Accordingly, the preferred embodiments of the present invention provide for a delivery system that avoids the above-mentioned drawbacks.

According to a first aspect of the present invention, there is provided a logging module for identifying a suspected tampering condition of an access-controlled container, the logging module comprising: data collection means configured to collect data from said access-controlled container; and communication means for communicatively connecting the logging module across a network to a database storing a use history associated with said access-controlled container; wherein the logging module is configured to compare the collected data to the corresponding use history associated with said access-controlled container stored in the database to identify a suspected tampering condition of said access controlled container, wherein the use history comprises data associated with the weight and/or volume of content of the access-controlled container.

The logging module may be configured to identify a suspected tampering condition of the access-controlled container if a deviation from an expected relationship between the collected data and the corresponding use history is identified during comparison of the collected data to the corresponding use history. By comparing the collected data and the corresponding use history of the access controlled container, and identifying a deviation to identify a suspected tampering condition, multiple potential indicators that could each indicate whether or not the container has been tampered with can be independently assessed. In this way, a more accurate determination of whether or not the access-controlled container has been tampered with can be performed. Furthermore, since the use history of the access-controlled container is kept separate from the data collected from the access-controlled container, the difficulty of tampering with an access-controlled container in a way that would not be detected is increased, since an unauthorised party would not have access or be able to change the use history of the access-controlled container even if the unauthorised party managed to gain access to an access-controlled container.

The use history associated with said access-controlled containers may comprise data selected from the group of: time and date; logging module ID; access-controlled container unique identifier; dispensing unit unique identifier; tamper-evident status data; weight of the access-controlled container; volume of the content of the container; weight of the content of the container; residual weight of the access-controlled container; stock in/stock out data; location data; location duration data and expiration data. Each of the above may be independently assessed with data collected from the access-controlled container to increase the likelihood of detecting suspected tampering of the access-controlled container.

The use history being associated with the weight and/or volume of the content of the access-controlled container is advantageous, since this allows for detection of tampering with the content of the container in addition to detecting counterfeit containers.

The logging module may be configured to extract a unique identifier for said access-controlled container from the data collected by the data collection means and retrieve the corresponding use history associated with said access-controlled container having the unique identifier from the database. By assigning a unique identifier to each access-controlled container, and by automatically retrieving the corresponding use history associated with this unique identifier, an improvement in the speed and computational power required to assess whether the access controlled container is suspected of having been tampered with can be achieved.

The logging module may be incorporated in a printer and the access-controlled container may be an ink cartridge.

The printer may comprise a docking station configured to receive the ink cartridge to allow ink stored in the ink cartridge to be deposited inside the printer. The logging module may be configured to activate a locking mechanism to stop functionality of the docking station if the logging module identifies a suspected tampering condition of the ink cartridge. Such a system would prevent ink from a tampered ink cartridge to be used to counterfeit high-value items using that printer. Similarly, the logging module may be configured to activate a locking mechanism to stop functionality of the ink cartridge, if the locking module identifies a suspected tampering condition of the ink cartridge. Such a system would also prevent ink from a tampered cartridge to be used in the counterfeiting of high-value items. Preventing use of the access-controlled container or preventing the act of depositing the contents of the access-controlled container is not limited to the example where the access-controlled container is an ink cartridge, but is a general teaching applicable to other embodiments falling within the scope of the appended claims.

The logging module may be incorporated into the docking station of the printer. Incorporating the logging module into the docking station allows for an increased ease of use, since data can be collected during insertion of the ink cartridge into the printer during a refill operation.

The logging module may comprise a transmission means configured to transmit an alarm or a notification of suspected tampering to the central database via the communication means in reaction to the logging module determining suspected tampering of the access-controlled container. By transmitting an alarm or a notification of suspected tampering to the central database, the secure delivery system may allow a quick response to suspected tampering of an access controlled container, or may aid identification of where the suspected tampering occurred. Identifying the location where the suspected tampering occurred allows for further precautions to be subsequently put in place to monitor the location at which the suspected tampering of the access-controlled container occurred, and thereby reduce the risk of tampering of other access-controlled containers occurring in the same manner at the same location in the future.

The data collection means may comprise means for monitoring the weight of the access-controlled container during the refill or filling operation. Monitoring the weight of the access-controlled container throughout the refilling or filling operation allows for the accurate recording of the initial and residual weight of the access-controlled container, thereby reducing the likelihood of a false suspected tampering condition being determined for that access-controlled container at a later stage.

As detailed above, monitoring the weight of the content of the container allows for detection of suspected tampering of the content of the container in addition to detection of suspected tampering of the container itself (such as the container being a counterfeit container).

According to a second aspect of the invention, there is provided an access controlled container for use with the logging module as detailed above, the access controlled container comprising a unique identifier, preferably wherein the unique identifier comprises a human readable code and/or a machine readable code attached to the access controlled container. As detailed above, incorporating the unique identifier into the access-controlled container allows for the use history associated with the access-controlled container to be retrieved from a database quickly and efficiently.

The access controlled container may comprise a tamper evident attachment attached to the access controlled container such that the tamper evident attachment must be removed to access contents from the access controlled container. Use of a tamper evident attachment that must be removed to access contents from the access-controlled container allows for an operator or machine to quickly determine whether an access-controlled container has been tampered with.

The access-controlled container may comprise use indicators configured to indicate whether or not the access-controlled container has been open. The incorporation of use indicators allows an operator or machine to quickly determine if an access-controlled container has been tampered with.

The access-controlled container may be made from a metal or a tough plastic to prevent unauthorised person from easily penetrating the container to gain access to the contents. The access-controlled container may be made from aluminium.

According to a third aspect of the present invention, there is provided a method of detecting suspected tampering of an access-controlled container, the method comprising the steps of: collecting data associated with the access-controlled container; comparing the collected data with a stored use history associated with the access-controlled container, the use history comprising data associated with the weight and/or volume of content of the access-controlled container; identifying whether or not there is a deviation between an expected relationship between the collected data and the use history; and, if a deviation is detected, performing a tamper response function.

The tamper response function may comprise at least one of recording a possible tampering of the access-controlled container on a database; registering an alert or an alarm; activating a locking device on the access-controlled container to prevent use of the access-controlled container, or activating a locking device on a docking station or on the access-controlled container to prevent the depositing of the contents of the access-controlled container in the printer. Each of the above tamper response functions reduces the likelihood that the contents of the access-controlled container are used for an unauthorised purpose.

According to a fourth aspect of the present invention, there is provided a system for identifying a suspected tampering condition of an access-controlled container, the system comprising: a database storing one or more use histories, each use history being associated with said access-controlled container, the use history comprising data associated with the weight and/or volume of content of the access-controlled container; and one or more logging modules communicatively connected to the database via a network connection; wherein each of the one or more logging modules is configured to collect data associated with said access-controlled container and the one or more logging modules or the database is configured to compare the collected data to the corresponding use history associated with said access-controlled container stored in the database to identify a suspected tampering condition of said access-controlled container.

Each of the one or more logging modules or the database may be configured to identify a suspected tampering condition of the access controlled container if a deviation from an expected relationship between the collected data and the corresponding use history is identified during comparison of the collected data of corresponding use history. By comparing the collected data and the corresponding use history of the access controlled container, and identifying a deviation to identify a suspected tampering condition, multiple potential indicators that could each indicate whether or not the container has been tampered with can be independently assessed. In this way, a more accurate determination of whether there is a suspicion that the access-controlled container has been tampered with can be performed.

Furthermore, since the use history of the access-controlled container is kept separate from the data collected from the access-controlled container, the difficulty of tampering with an access-controlled container in a way that would not be detected is increased, since an unauthorised party would not have access to or be able to change the associated use history of the access-controlled container even if the unauthorised party managed to gain access to an access-controlled container.

The data associated with the access controlled container comprises data selected from the group of: time and date; logging module ID; access controlled container unique identifier; dispensing unit unique identifier; tamper evidence status data; weight of the access controlled container; residual weight of the access controlled container; volume of the content of the container; weight of the content of the container; stock in/stock out data; location data; location duration data and expiration data. Each of the above may be independently assessed with data collected from the access-controlled container to increase the likelihood of detecting tampering of the access-controlled container.

The access-controlled container may be an ink container and the at least one or more logging modules may be a printer.

The database may be configured to update the stored one or more use histories using the collected data. Updating the stored one or more use histories allows for real-time management and detection of suspected tampering conditions.

Furthermore, updating the stored one or more use histories using the collected data allows for the accuracy of the identification of a deviation between any subsequent collected data and the updated use history to be increased.

When the database is configured to compare the collected data to the corresponding use history stored in the database to identify a suspected tampering condition of the access-controlled container, the database may be configured to register an alarm or record a notification of suspected tampering in reaction to the database determining suspected tampering of the access-controlled container.

According to a fifth aspect of the present invention, a logging module is used to identify a suspected tampering condition of an access-controlled container, the logging module comprising: data collection means configured to collect data from the access-controlled container; and communication means for communicatively connecting the logging module across a network to a database storing a use history associated with the access-controlled container, the use history comprising data associated with the weight and/or volume of content of the access-controlled container.

The logging module for this use may be the logging module as described above.

BRIEF DESCRIPTION OF THE DRAWINGS

In order to better understand the present invention, and to show how the same may be carried into effect, reference will be made, by way of example only, to the following drawings, in which.

DETAILED DESCRIPTION

Figure 1:
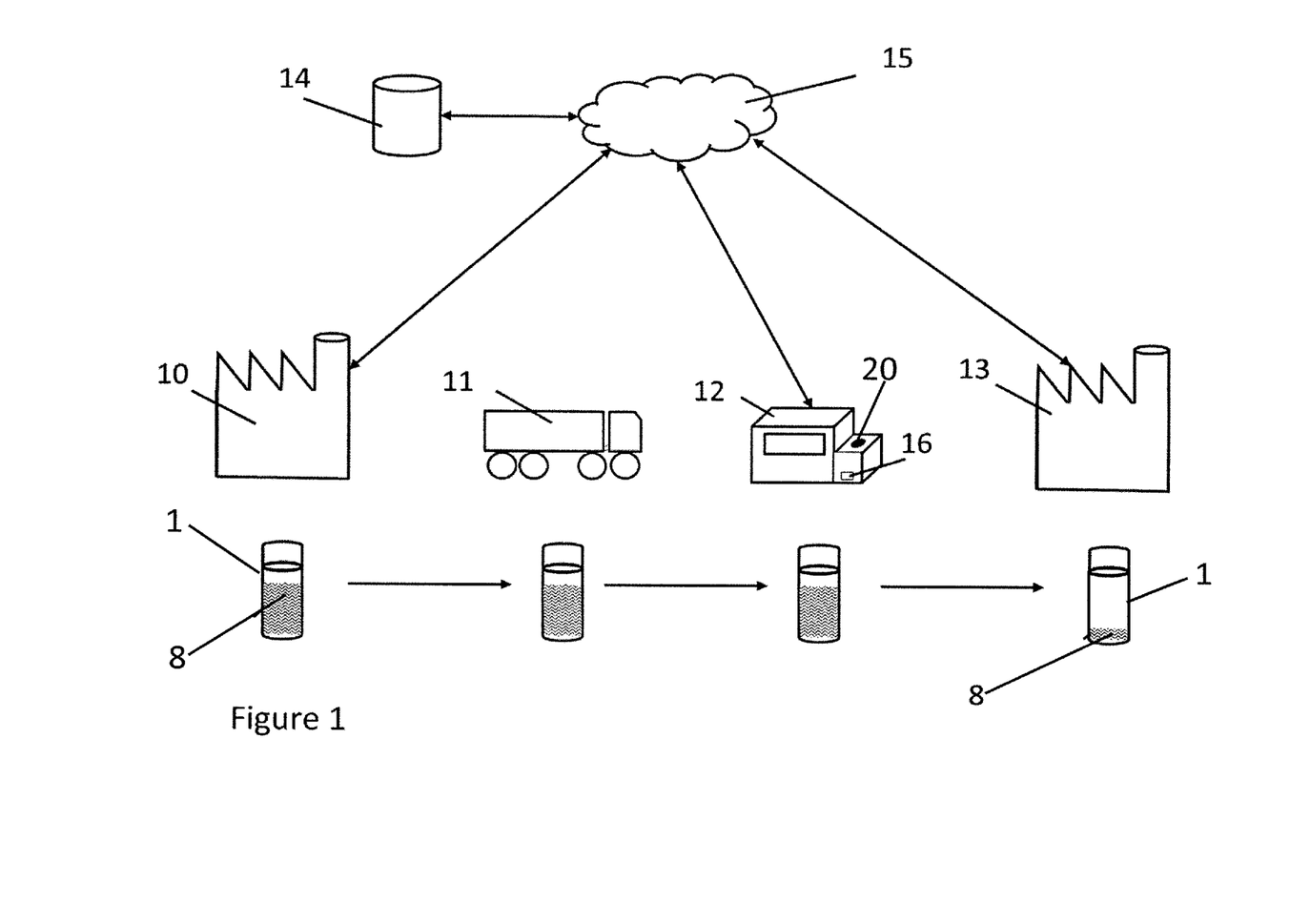
FIG. 1 shows a schematic view of the lifecycle of an access-controlled container.

The secure delivery system is designed to protect access to the contents of the access-controlled container 1 throughout the entire lifecycle of the access-controlled container. Referring to FIG. 1, the lifecycle of an access-controlled container includes the initial filling of the access-controlled container in a production facility 10, the distribution and transport of the access-controlled container in a supply chain 11, dispensing of the contents 8 of the access-controlled container 1 at an intended use site 12 (which may be a printer including a data collection means 16 and a docking station 20 for receiving the access-controlled container) and the secure destruction of the access-controlled container 1 following use at a destruction facility 13. Throughout this application, the secure delivery system will be described in relation to protecting a security ink over the duration of its lifecycle, but the secure delivery system could equally be used to protect any consumable requiring a high level of access control such as medicines, chemical and petrochemical products such as pesticides, explosive materials, fuel and the like.

Figure 2:
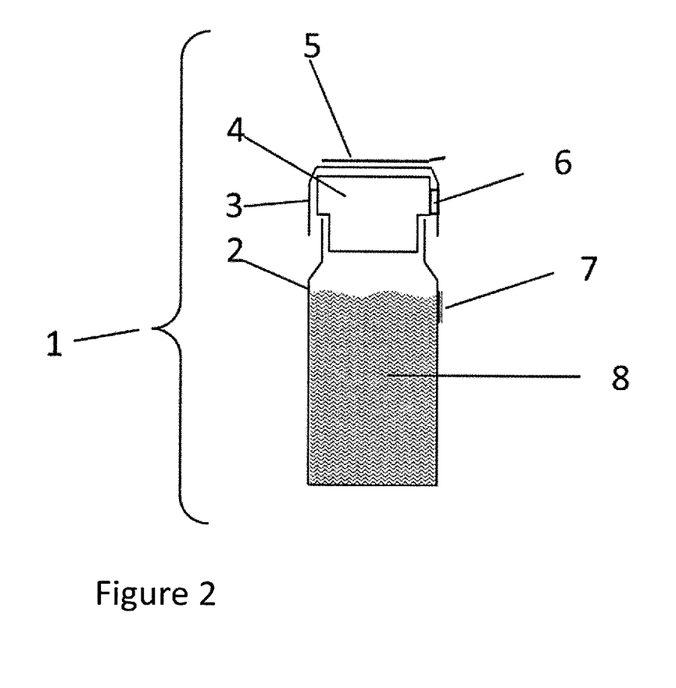
FIG. 2 shows a single access controlled container.

At the production facility 10, ink 8 is deposited into an access-controlled container 1. After the ink 8 has been deposited into the access-controlled container 1, the access-controlled container is sealed at a sealing station in the production facility 10. Referring to FIG. 2, the access-controlled container may be sealed by inserting a single-use valve 4 into an opening 2 of the access-controlled container 1. The single-use valve 4 may be covered by an outer casing 3 that restricts access to the single use valve 4. A tamper-evident tab 5 may be affixed to the top of the outer casing 3. The access-controlled container 1 may be an aluminium cartridge. It will be readily understood by the person skilled in the art that the access-controlled container 1 may have another shape or may be made of another material. However, depending on the properties of the ink or other material contained inside the access-controlled container, the material of the access-controlled container should not react with, or be weakened by, any chemical interaction between the material of the access-controlled container and the contents.

A human readable or machine readable unique code 7 may be applied to the outside of the access-controlled container so that it can be unambiguously distinguished from other identical containers. The unique code may be applied by printing it on a label which is directly affixed to the canister, for example by an adhesive. Alternatively, the unique code 7 may be directly printed, embossed, engraved or otherwise visibly embedded in the material of the canister. The unique code may comprise a human readable code comprising letters and/or numbers and/or pictorial information, and/or may include a 1-D, 2-D or 3-D bar code or any other type of machine readable code, such as a QR code. The unique code 7 may be applied with a security feature such as printing with a security ink to prevent tampering with the code. Other types of security features could also be used to apply the code to the access-controlled container, such as a secure label with one or more visible or machine-readable security features.

A tamper-evident tab 5 may be placed on top of the access-controlled container 1 to cover the location where the container 1 would be inserted into the docking station 20 to refill the printer 12. The tamper-evident tab 5 must be removed prior to insertion of the container 1 into the docking station 20 in order to empty the ink 8 in the container 1 into the printer 12.

Figure 4:
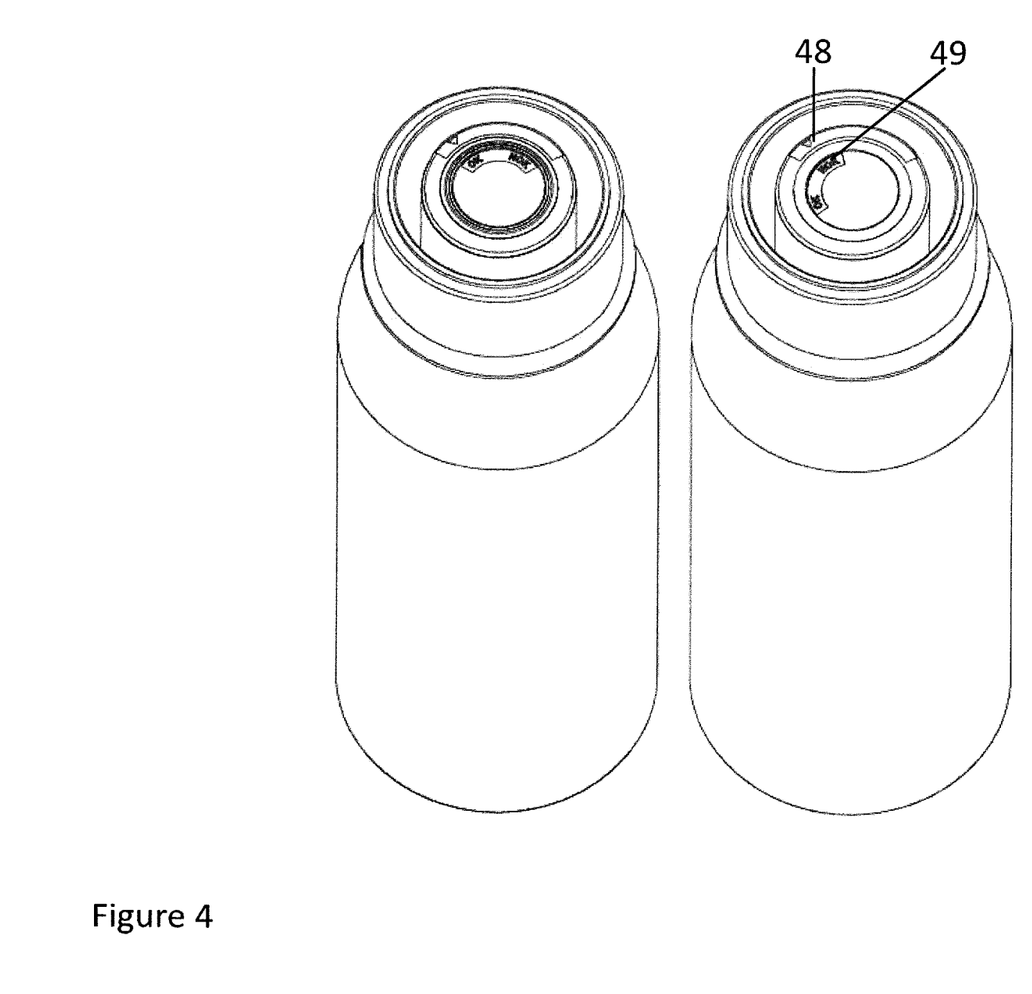
FIG. 4 shows use indicators on the cap of an access controlled container.

As shown in FIG. 4, use indicators 48, 49 may be included on the container 1. These use indicators 48, 49 are configured to indicate whether the single-use valve of the container 1 has been opened. The use indicators 48, 49 may be mechanical, and rely upon a rotation of the single-use valve with respect to the outer housing to rotate wording 49 on the single use valve indicating that the singe use valve has not been used ("OK") out of line with an arrow 48 on the outer housing and to rotate wording 49 on the single use valve indicating that the single used valve has been used ("NOK") into line with the arrow 48 on the outer housing. Alternatively and/or additionally, the use indicators 48, 49 may comprise electronic indication such as coloured LEDs or another mechanical indicating means.

An RFID tag 6 programmed with a unique code may be incorporated into the container 1. For example the RFID tag 6 may be placed on the inside of the outer housing 3 so that the RFID tag 6 is invisible and inaccessible to operating personnel that are required to handle the container 1. The RFID tag 6 may be an active RFID tag powered by a battery and comprising a memory for storing data associated with the access-controlled container. Alternatively, the RFID tag 6 may be a passive RFID tag capable of providing a response to an interrogation signal from a RFID reader.

The access-controlled container is then weighed to confirm the quantity of ink 8 it contains, and a unique identifier is encoded in the RFID tag 6. Alternatively, the embedded unique ID of the RFID tag 6 may be used as the unique identifier. Other means for encoding the unique identifier are also envisaged, such as a radio transmitter or an electronic circuit allowing for wireless communication. However, for conciseness, the description below will refer to an RFID tag 6.

Figure 6:
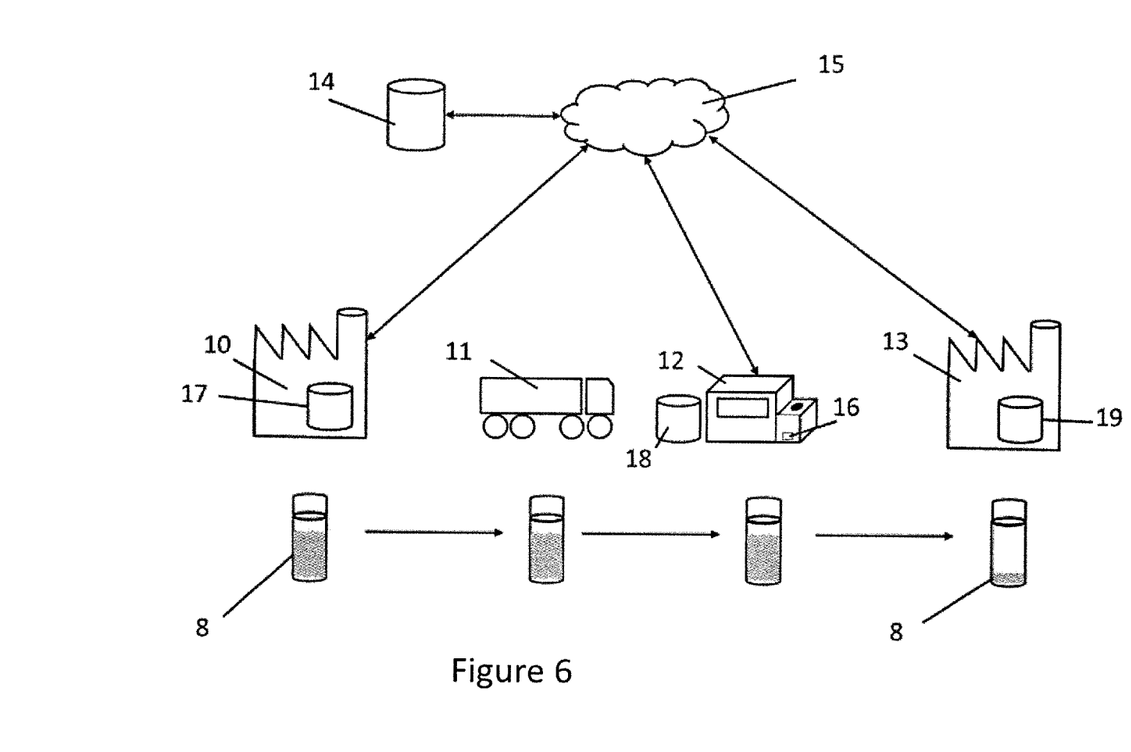
FIG. 6 shows another schematic view of the lifecycle of an access-controlled container.

The unique identifier encoded in the RFID tag 6 is associated with the unique code 7 applied to the container 1. These associated codes are recorded in a database 14 (shown in FIG. 1), along with the current time, date and the date of expiration of the ink 8, along with other associated data. Furthermore, this data may also be recorded in the active RFID tag 6. The container 1 is also weighed and the weight is recorded in the database 14 and, if possible, in the RFID tag 6. Furthermore, tamper-evident status data, for example data relating to whether or not the tamper-evident tab 5 has been removed, may be recorded in the database 14. The database 14 may be a central database located remotely from the production facility 10 and connected to the production facility by the internet or another type of network connection 15. However, the central database 14 may alternatively be co-located at the production facility 10. A distributed database may alternatively be employed instead of a central database, as shown in FIG. 6. Specifically, a distributed database may include a plurality of databases 14, 17, 18, 19 connected across the network 15, the plurality of databases being located at different locations and each storing some or all of the use history associated with the access-controlled container. The central or distributed database may also include database management software that may be configured to perform comparisons of collected data and corresponding use histories, as shall be detailed below.

After the container 1 is weighed and the unique identifiers of the RFID tag 6 and the unique code 7 have been associated and stored in the database 14 along with other data such as the current time and date, the ink expiration date, tamper evident status, the dispensing unit unique identifier signifying the authorized dispensing unit at which the ink should be dispensed and the ink weight, the access-controlled container is then loaded onto a means of transportation and enters the distribution and supply chain 11, as shown in FIG. 1.

In practice, the access-controlled container 1 may transit between one or more intermediate storage locations along the supply chain 11. For example, the access-controlled container 1 may be transported and stored at conditioning sites, printing sites and storage sites before arriving at the intended use location 12. At the intended use location 12 and at each intermediate location in the supply chain 11 where the access-controlled container 1 is stored, there is provided a logging module 16. The logging module comprises a communication means to communicatively connect the logging module across the network 15 to the database 14. The logging module also comprises data collection means to collect data from the access-controlled container 1. The data collection means may be an RFID reader to read the RFID tag. Alternatively, the data collection means may be an electronic circuit and associated sensors configured to collect data relating to the access-controlled container 1.

At each location in the supply chain 11 that comprises a logging module 16, data relating to the container 1 is collected by the data collection means. This data collection is logged in each logging module 16 and is recorded by the system as part of a stock-in/stock-out procedure. The information stored in the RFID tag 6 may be read, and the time, date, tamper evident status, use status and weight may be recorded at each logging module. At each logging module the data may be recorded in the database 14 and/or the RFID tag 6. Furthermore, other data such as the location of the access-controlled container 1 and the duration that the access-controlled container 1 has been at that location can be logged and recorded on the database 14. At each location, data is collected from the container 1 by the logging module 16 and this data can be used to update the use history stored in the database 14.

At the end of the supply chain 11, the access-controlled container arrives at the intended use location 12. The intended use location 12 may be a printer.

The unique identifier of the container 1 and the human-readable code 7 may be associated in the database 14 with one or more printers 12 corresponding to the intended point-of-use of the container 1. Each printer 12 may be assigned a dispensing unit unique identifier, which may be a unique printer ID number. The unique identifier and human-readable code 7 of the access-controlled container 1 may optionally be transferred to local storage in the printer 12 at the point of use.

At the point of use, prior to mounting the access-controlled container 1 on the printer 12, the access-controlled container 1 is checked by the operator to make sure the tamper-evident tab 5 has not been removed and that the use indicators 48 and 49 show that the container 1 has not yet been opened. If the tamper-evident tab 5 has been removed, the ink cartridge 1 may have been tampered with and the incident should be reported by the operator. The operator may enter the status of the tamper-evident tab 5 into the data collection means associated with the logging module 16 of the printer 12. Alternatively, the operator may enter the tamper-evident status into a local or hand-held reader or into a terminal connected to the database 14. Alternatively, the data collection means may automatically detect and record the status of the tamper-evident tab 5.

The single-use valve 4 may be keyed to the docking station 20 on the printer 12, meaning that the access-controlled container has a proprietary connection apparatus that can only be mounted on a docking station 20 that has been designed to accept it and to open it. The single-use mechanism of the single-use valve 4 ensures that once the access-controlled container 1 is mounted on the docking station 20, it can be opened once and only once to dispense the ink into the printer 12.

Figure 3:
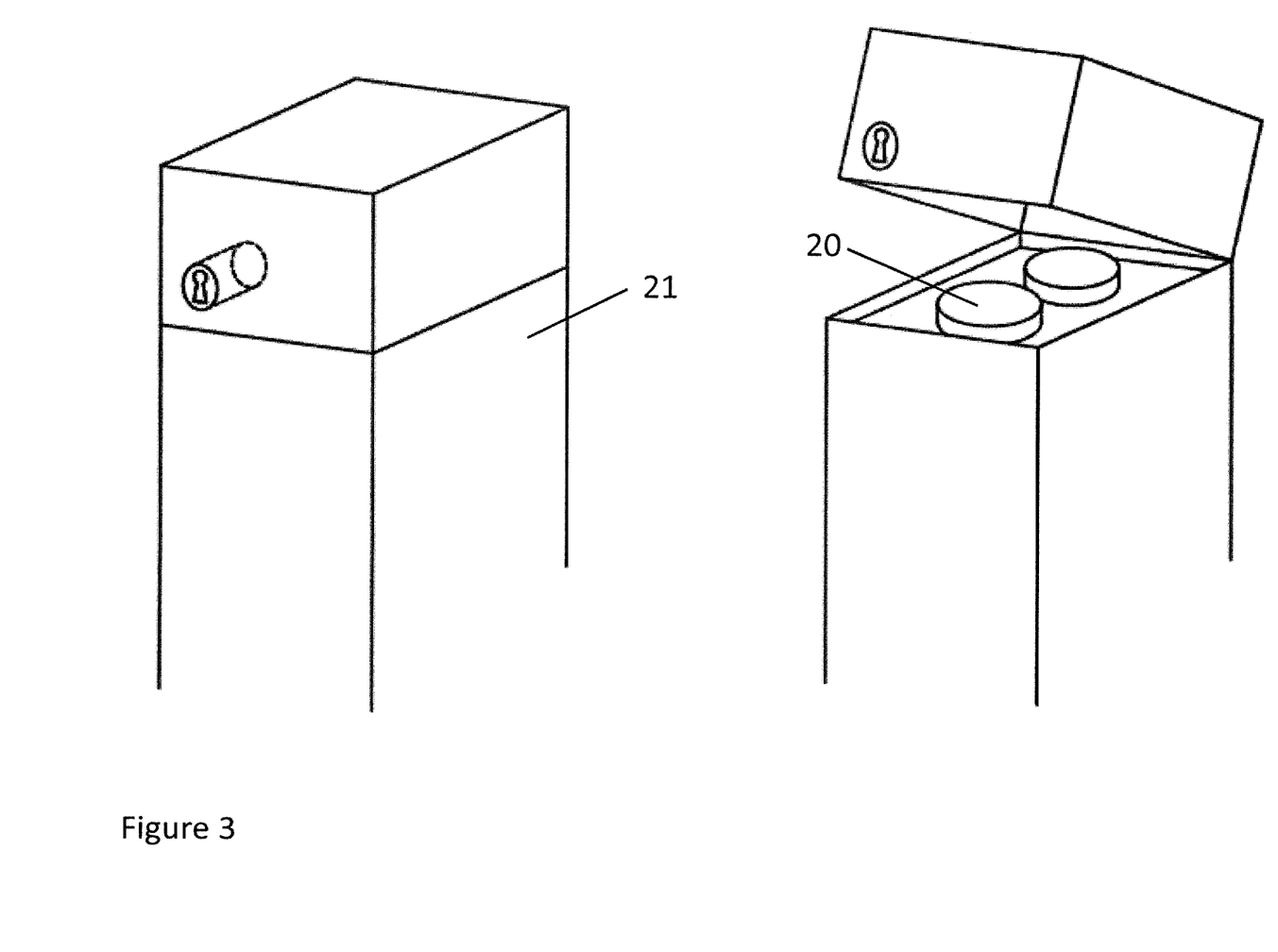
FIG. 3 shows a printer re-filling compartment.

The docking station 20 is mounted on the printer 12 and is accessible through a locked compartment 21 as shown in FIG. 3. An operator wishing to refill the printer 12 with the ink 8 in the container 1 must first present the container 1 to the logging module 16 of the printer 12. The logging module will collect data including the unique identification number of the container, the expiration date and the expected weight of the cartridge. Other data may also be collected by the logging module 16, such as the tamper-evident status data. The printer 12 may then verify the presence of the unique identification number associated with the container 1 in a local list of authorized containers stored in the memory of the printer 12. Alternatively, the printer 12 may send a query to the database 14 when a new container 1 is inserted to confirm that it has been authorized for use. This confirmation includes the steps of comparing the unique identification number to the intended point-of-use data in the use history on the database, which use history is associated with the container 1. Alternatively, the printer may compare the collected dispensing unit unique identifier stored on the RFID tag (6) to its own unique identifier.

The same authorisation process may be performed with respect to the other collected data. Specifically, data collected by the logging module 16 may be compared to the corresponding use history stored in the database 14 to detect a deviation of the collected data from that expected by the corresponding use history.

The comparison may be performed by software run on the logging module 16 or printer 12. Alternatively, the comparison may be performed by software run on the central database or the distributed database.

If the container 1 has not been authorized for use in the printer 12 a message may be shown to the operator on a display screen of the printer 12 to alert the operator of suspected tampering of the access-controlled constraint. Additionally and/or alternatively, an alarm will be transmitted and recorded in the database 14, and an instruction message will be shown to the operator informing him what to do next. Alternatively, if the database 14 performs the comparison between the collected data and the corresponding use history, the database 14 may register an alert or record a notification of suspected tampering. The logging module 16 is preferably integrated into the docking station 20 so that the unique identification number of the cartridge 1 will be read by the printer 12 when the container 1 is inserted into the docking station 20. The unique identification number of the container 1 may be read by the RFID reader 16 and verified by a control mechanism of the printer 12 while the ink 8 is being dispensed. If the unique identification number of the container 1 is not authorized for use in printer 12, the control system may lock the docking station 20 so that the ink 8 in the container cannot be dispensed into the printer 12. Additionally and/or alternatively, the control system may transmit a signal to the access-controlled container to lock a locking member on the container 1 so that the ink 8 is locked inside the container 1.

If the container 1 is authorized for use in printer 12 the operator will unlock the compartment 21 to obtain access to the docking station 20. The operator must remove the tamper-evident tab 5 on the outer housing 3 of the container 1 to allow mounting of the container 1 on the docking station 20.

Figure 5:
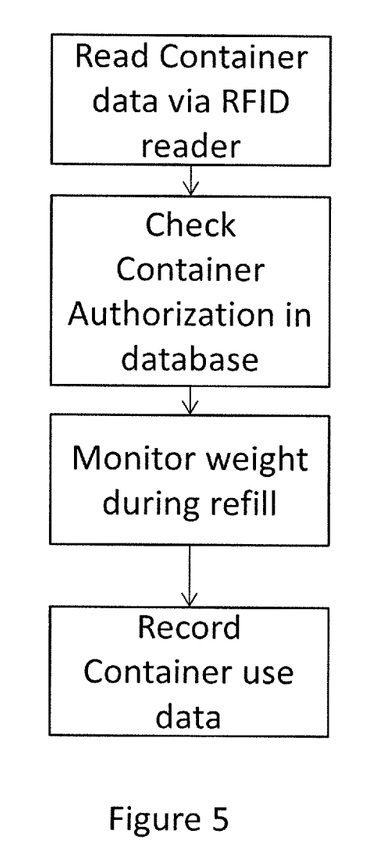
FIG. 5 shows steps performed by a logging module during a re-fill process.

During the refilling process, the printer 12 may monitor the weight of its internal reservoir and/or the weight of the ink in the container 1 and store the data concerning the amount of ink dispensed into the printer 12. At the end of the refilling operation, the printer 12 will calculate the residual ink left in the container 1 by calculating the difference between the expected weight read from the RFID tag 6 at the start of the operation and the weight of the ink 8 introduced during the refilling process. The time and date, printer ID number, tamper-evident status, and residual weight are recorded into the database 14. The cartridge use data may be written to the RFID tag 6 and/or recorded in the printer or in another system local to the point of use. A condensed flow chart of the operations of the logging module 16 of the printer during the refill operation is shown in FIG. 5.

After depositing the ink 8 inside the intended use location 12, the access-controlled container 1 (which may include a residual amount of ink 8) is transported to a destruction facility 13, where it is destroyed. The destruction facility also includes a logging module 16. The destruction facility may be co-located with the printer 12 or may be located in a remote location. The container 1 may pass through one or more storage facilities or transport vehicles between the point-of-use and the destruction facility 13. Again, each of the one or more storage facilities comprises a logging module 16 and data is collected from each container 1 at each logging module 16 as part of a stock in/stock out procedure.

Upon reception of the container 1 at the destruction facility 13, data from the RFID tag 6 is read using an logging module located at the destruction facility 13. Using the unique identification number read from the RFIG tag 6, the production and use history of the container 1 may be retrieved from the database 14. The cartridge 1 is then weighed and its weight is compared to the expected weight of the residual ink left in the cartridge that was calculated by the printer 12 at the end of the refilling process. The tamper-evidence tab 5 status is checked and the use indicators 48 and 49 on the container 1 are examined to make sure they are consistent with the use history stored on the database. If the container 1 has been used to refill a printer 12, the printer ID number can be checked to make sure it corresponds to the ID number of one of the list of authorized printers.

If, at any logging module 16, any of the data concerning the tamper-evidence tab 5, or the use indicators 48 and 49, or the weight of the contents or other collected data are inconsistent with the use history of the cartridge 1, a notification of suspected tampering can be sent to the central database 14 along with an indication of the time, date and location of suspected tampering (this data being read from the history of stock-in/stock-out stored in the database). The use history of the container 1 obtained from the database 14 is compared with the data stored in the RFID tag 6 and any discrepancy/deviation from the expected relationship is notified to the database 14.

Since the date and time of all the stock-in/stock-out and dispensing operations are recorded, the length of time the container 1 remains in any location and/or the length of time the container 1 takes to be transferred to one location after being removed from a previous location can be measured and recorded in the database 14. If at any point, the container 1 spends longer than necessary in transit or in a given location, the event can be identified as an activity that may indicate tampering.

Finally, when the destruction of the container is completed, the full use history and any tamper response functions such as notifications or alarms, if any, may be transferred to the central database for archival storage. In the description above, the operations of the cartridge, docking station and printer are described as if the operations were carried out by a human operator executing a manual procedure. It will be obvious to one skilled in the art that such operations may be automated such that they are carried out by an automatic mechanical process, such as that afforded by industrial robotics. The access-controlled container and docking station may be used in a variety of applications involving the transfer and/or refill of various substances from one container to another wherein the substances require protection from unauthorized access either because they are hazardous or because their value makes them a target of theft or misuse.

Neither is this specification limited to the storage and transfer of liquids; it is equally applicable for use with matter in any phase in which it can flow such as gaseous, fluid, solid or powder. In addition to ink, such materials could be substances for use in manufacturing, in particular composite or additive manufacturing, such as lacquers, resins, epoxy, polymers, metals, cutting or drilling fluids. Other applications could involve solvents or specialty cleaning fluids, fuels in liquid or gaseous phases, lubricants or petrochemical products. The above-described embodiments could be especially useful in liquid manufacturing processes, and for production of liquid pharmaceuticals as well as for containing hazardous waste products, pesticides or explosives whose transfer from one container to another must be tightly controlled and limited to a single transfer operation.

Further modifications will be apparent to those skilled in the art from a consideration of the disclosure provided herein. Consequently, it is not intended that this invention be limited to the specific embodiments provided herein, but that it covers all modifications and alternatives falling with the scope of the appended claims.

The invention claimed is:

1. A logging module for identifying a suspected tampering condition of an access-controlled container, the logging module comprising:
    data collection means configured to collect data from said access-controlled container; and
    communication means for communicatively connecting the logging module across a network to a database storing a use history associated with said access-controlled container;
    wherein the data collection means is configured to collect data from use indicators of the access-controlled container configured to indicate whether a single-use valve of the access-controlled container has been opened;
    wherein the logging module is configured to compare the collected data to the corresponding use history associated with said access-controlled container stored in the database to identify a suspected tampering condition of said access-controlled container, wherein the use history comprises data associated with the weight and/or volume of content of the access-controlled container and data associated with the use indicators of the access-controlled container;
    wherein said access-controlled container is an ink cartridge and the logging module is incorporated in a printer, the printer comprising a docking station configured to receive said ink cartridge to allow ink stored in said ink cartridge to be deposited inside the printer, and if the logging module identifies a suspected tampering condition of said ink cartridge, the logging module is configured to activate a locking mechanism on the docking station to prevent the depositing of the contents of the ink cartridge in the printer.

2. The logging module of claim 1, wherein the logging module is configured to identify a suspected tampering condition of said access-controlled container if a deviation from an expected relationship between the collected data and the corresponding use history is identified during comparison of the collected data to the corresponding use history.

3. The logging module of claim 1, wherein the logging module is configured to extract a unique identifier for said access-controlled container from the data collected by the data collection means and retrieve the corresponding use history associated with said access-controlled container having the unique identifier from the database.

4. The logging module of claim 1, wherein the logging module further comprises a transmission means configured to transmit an alarm or a notification of suspected tampering to the database via the communication means in reaction to the logging module determining suspected tampering of said access-controlled container.

5. An access-controlled container for use with the logging module of claim 1, the access-controlled container comprising a single-use valve, use indicators configured to indicate whether the single-use valve has been opened, and a unique identifier, preferably wherein the unique identifier comprises a human-readable code and/or a machine-readable code attached to the access-controlled container.

6. The access-controlled container of claim 5, further comprising a tamper evident attachment attached to the access-controlled container such that the tamper evident attachment must be removed to remove contents from the access-controlled container.

7. A method of detecting suspected tampering of an access-controlled container, the method comprising the steps of:
    collecting data associated with the access-controlled container, wherein collecting the data associated with the access-controlled container comprises collecting data from use indicators of the access-controlled container configured to indicate whether a single-use valve of the access-controlled container has been opened;
    comparing the collected data with a corresponding stored use history associated with the access-controlled container, the use history comprising data associated with the weight and/or volume of content of the access-controlled container and data associated with the use indicators of the access-controlled container;
    identifying whether or not there is a deviation between an expected relationship between the collected data and the corresponding use history;
    and, if a deviation is detected, performing a tamper response function, wherein said access-controlled container is an ink cartridge, and the tamper response function comprises activating a locking device on a docking station of a printer to prevent the depositing of the contents of the ink cartridge in the printer, where the docking station is configured to receive said ink cartridge to allow ink stored in said ink cartridge to be deposited inside the printer.

8. The method of claim 7, wherein the tamper response function further comprises at least one of recording a possible tampering of the access-controlled container on a database; registering an alert, activating a locking device on the access-controlled container to prevent use of the access-controlled container.

9. A system for identifying a suspected tampering condition of an access-controlled container, the system comprising:
- a database storing one or more use histories, each use history being associated with said access-controlled container, the use history comprising data associated with the weight and/or volume of content of the access-controlled container and data associated with use indicators of the access-controlled container configured to indicate whether a single-use valve of the access-controlled container has been opened; and
- one or more logging modules comprising a communication means and a data collection means and communicatively connected by the communication means to the database via a network connection;
- wherein each of the one or more logging modules is configured to collect by the data collection means data associated with said access-controlled container and the one or more logging modules is configured to compare the collected data to the corresponding use history associated with said access-controlled container stored in the database to identify a suspected tampering condition of said access-controlled container,
- wherein the data collection means is configured to collect data from the use indicators of the access-controlled container, and
- wherein said access-controlled container is an ink cartridge and at least one of the one or more logging modules is incorporated in a printer, the printer comprising a docking station configured to receive said ink cartridge to allow ink stored in said ink cartridge to be deposited inside the printer, and if the at least one of the one or more logging modules identifies a suspected tampering condition of said ink cartridge, the at least one of the one or more logging modules is configured to activate a locking mechanism on the docking station to prevent the depositing of the contents of the ink cartridge in the printer.

10. The system of claim 9, wherein each of the one or more logging modules is configured to identify a suspected tampering condition of said access-controlled container if a deviation from an expected relationship between the collected data and the corresponding use history is identified during comparison of the collected data to the corresponding use history.

11. The system of claim 9, wherein the database is configured to compare the collected data to the corresponding use history associated with said access-controlled container stored in the database to identify a suspected tampering condition of said access-controlled container, and wherein the database is configured to register an alarm or record a notification of suspected tampering in reaction to the database determining suspected tampering of said access-controlled container.

12. Use of a logging module to identify a suspected tampering condition of an access-controlled container, the logging module comprising:
- data collection means configured to collect data from the access-controlled container; and
- communication means for communicatively connecting the logging module across a network to a database storing a use history associated with the access-controlled container,
- wherein the data collection means is configured to collect data from use indicators of the access-controlled container configured to indicate whether a single-use valve of the access-controlled container has been opened;
- wherein the logging module is configured to compare the collected data to the corresponding use history associated with said access-controlled container stored in the database to identify a suspected tampering condition of said access-controlled container, wherein the use history comprises data associated with the weight and/or volume of content of the access-controlled container and data associated with the use indicators of the access-controlled container,
- wherein said access-controlled container is an ink cartridge and the logging module is incorporated in a printer, the printer comprising a docking station configured to receive said ink cartridge to allow ink stored in said ink cartridge to be deposited inside the printer, and if the logging module identifies a suspected tampering condition of said ink cartridge, the logging module is configured to activate a locking mechanism on the docking station to prevent the depositing of the contents of the ink cartridge in the printer.

* * * * *